(12) United States Patent
Schiller (10) Patent No.: US 6,946,695 B2
(45) Date of Patent: Sep. 20, 2005

(54) SOLID-STATE ROTATIONAL RATE SENSOR DEVICE AND METHOD (75) Inventor: Peter J. Schiller, Coon Rapids, MN (US)

(73) Assignee: Triad Sensors, Inc., Minneapolis, MN (US)

( * ) Notice: Subject to any disclaimer, the term of this patent is extended or adjusted under 35 U.S.C. 154(b) by 112 days.

(21) Appl. No.: 10/636,054

(22) Filed: Aug. 7, 2003

(65) Prior Publication Data

US 2004/0026720 A1 Feb. 12, 2004

Related U.S. Application Data

(60) Provisional application No. 60/402,104, filed on Aug. 8, 2002.

(51) Int. Cl.$^7$ ............................................ H01L 27/148
(52) U.S. Cl. ........................ 257/226; 257/415; 257/420; 340/973; 340/974; 73/514.34; 73/862.381; 73/178 R
(58) Field of Search ................................ 257/226, 415, 257/420; 340/973, 974; 73/514.34, 862.381, 178 R (56) References Cited

U.S. PATENT DOCUMENTS

| | | | |
|---|---|---|---|
| 6,119,518 A | | 9/2000 | Itou et al. |
| 6,140,739 A | | 10/2000 | Arai et al. |
| 6,336,366 B1 | | 1/2002 | Thundat et al. |
| 6,853,315 B2 | * | 2/2005 | Schiller et al. ............. 340/974 |

FOREIGN PATENT DOCUMENTS

EP    0662601    7/1995

OTHER PUBLICATIONS

PCT International Search Report.

* cited by examiner

Primary Examiner—Nathan J. Flynn
Assistant Examiner—Remmon R. Fordé
(74) Attorney, Agent, or Firm—Dorsey & Whitney LLP (57) ABSTRACT

The present invention provides a solid-state rotational rate sensor device formed by a thin-film for generating an electrical voltage output proportional to the rate of rotational motion. The precision thin-film piezoelectric elements are configured and arranged on a semi-rigid structure to detect rotation (such as pitch, roll, and yaw) while rejecting spurious noise created by vibration, thermal gradients, and electro-magnetic interference.

17 Claims, 11 Drawing Sheets

SOLID-STATE ROTATIONAL RATE SENSOR DEVICE AND METHOD

CROSS-REFERENCE TO RELATED APPLICATION DATA

The present utility patent application claims priority of U.S. Provisional Patent Application Ser. No. 60/402,104, filed Aug. 8, 2002, subject matter of which is incorporated herewith by reference.

FIELD OF THE INVENTION

The present invention relates generally to a piezoelectric rate sensor device and method, and more particularly, to a solid-state piezoelectric rate sensor device and method for measuring the rate of rotational motion.

BACKGROUND OF THE INVENTION

Piezoelectric materials are used in a variety of sensors and actuators. Piezoelectric materials convert mechanical energy to electrical energy and vice versa. For instance, if pressure is applied to a piezoelectric crystal, an electrical signal is generated in proportion thereby producing the function of a sensor. Generation of an electrical signal in response to an applied force or pressure is known as the "primary piezoelectric effect". Similarly, if an electrical signal is applied to a piezoelectric crystal, it will expand in proportion as an actuator. Geometric deformation (expansion or contraction) in response to an applied electric signal is known as the "secondary piezoelectric effect". Whether operated as a sensor or actuator, electrically-conductive electrodes must be appropriately placed on the piezoelectric crystal for collection or application of the electrical signal, respectively. Therefore, a piezoelectric sensor (actuator) consists nominally of a) a portion of piezoelectric material, and b) electrically-conductive electrodes suitably arranged to transfer electrical energy to (from) an external power source.

Piezoelectric materials have been utilized to create a variety of simple sensors and actuators. Examples of sensors include vibration sensors, microphones, and ultrasonic sensors. Examples of actuators include ultrasonic transmitters and linear positioning devices. However, in most of these examples, bulk piezoelectric material is machined and assembled in a coarse manner to achieve low-complexity devices.

Generally, vibrating rotational rate sensors are based on the Coriolis effect. Existing Coriolis devices generate a primary vibration motion along a first axis direction and measure the amplitude of secondary vibration along a second axis direction, said first and second axis directions being perpendicular (orthogonal) to each other. According to the Coriolis effect, the amplitude of secondary vibration is proportional to the rate of rotation around a third axis direction, said third axis direction being perpendicular (orthogonal) to both said first and second axis directions. In existing vibrating rate sensors, the amplitude of secondary vibration is measured as an indicator of rotational rate. Sensors convert the amplitude of secondary vibration into an electrical signal proportional to the rotational rate. However, the amplitude of secondary vibration is also responsive to temperature, vibration, package strain, electromagnetic interference and other undesirable effects that corrupt the rate sensor data.

The existing vibrating rotational rate sensors rely on single-ended actuation and sensors to produce and measure the vibrational motion. Single-ended sensors are generally responsive to temperature, vibration, package strain, electromagnetic interference and other undesirable effects that corrupt the sensor data. Single-ended actuators provide less accuracy in controlling the vibrational motion.

Therefore, there is a need for an improved piezoelectric rate sensor device and method.

SUMMARY OF THE INVENTION

To solve the above and the other problems, the present invention provides a solid-state rotational rate sensor device. Similar to silicon Integrated Circuits (ICs), a rate sensor device is built up by a series of thin films, typically less than or about 10 micron (0.01 mm) in thickness. A rate sensor is designed to generate an electrical voltage output proportional to the rate of rotational motion.

The present invention provides precision thin-film piezoelectric elements on a semi-rigid structure to detect rotation (such as pitch, roll, and yaw) while rejecting spurious noise created by vibration, thermal gradients, and electromagnetic interference. During normal operation, selected piezoelectric elements on the rate sensor structure are driven by a first periodic electrical signal to create a controlled mechanical oscillation. When the rate sensor is subjected to rotational motion (such as pitch, roll, or yaw), a characteristic second electrical signal is produced across other piezoelectric elements on the rate sensor, according to the Coriolis Effect and primary piezoelectric effect. These second electrical signals are amplified and filtered through associated electrical circuitry to extract high-fidelity signals proportional to the rate of rotation.

In one embodiment, the present invention utilizes piezoelectric materials in a thin-film format. The thin-film distinction enables transducers with a far higher degree of complexity and accuracy. Thin-films offer the following key advantages:

Matching—Thin-film piezoelectric materials are deposited and defined on an atomic scale utilizing fabrication processes common in the semiconductor industry. The result is that thin-film piezoelectric elements can be consistently manufactured with element matching more than 100× better than conventional bulk machined devices.

Density—Thin-film piezoelectric elements are defined using microlithography, a process which enables extremely small dimensions (less than 0.001 mm, or 1 micron) to be delineated in a consistent and controlled manner. The result is that a large number of precision piezoelectric elements can be defined on a single microscopic transducer device.

Accuracy—In a thin-film format, piezoelectric materials exhibit reduced levels of random noise. At system level, the effect of lower noise is higher accuracy readings.

Low-Cost—Thin-film piezoelectric elements are defined using batch processing techniques common in the semiconductor industry. A typical deposition, pattern transfer, and etch sequence on a single silicon wafer defines literally millions of precision piezoelectric elements on thousands of transducers.

Size—Thin-film piezoelectrics enable far smaller devices to be manufactured.

Low Power—Less energy is required to operate a thin-film device.

The present invention further provides differential piezoelectric elements for sensing and driving the vibrational motion of the rotational rate sensor. Differential elements provide improved immunity to temperature, vibration, package strain, electromagnetic interference and other undesirable effects that corrupt sensor data in existing rate sensor devices.

The present invention further provides a method for detecting the Coriolis force based on the phase shift between the secondary and primary vibrational motions in a vibrating rotational rate sensor. By measuring the phase shift of the rate sensor output signals, further immunity to temperature, vibration, package strain, electromagnetic interference and other undesirable effects is achieved.

The above advantages are inherent to the present invention and enable novel configurations and unique features that increase the overall device and system performance.

These and other features and advantages of the present invention will become apparent to those skilled in the art from the following detailed description, wherein it is shown and described illustrative embodiments of the invention, including best modes contemplated for carrying out the invention. As it will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION OF THE PREFERRED EMBODIMENTS

The present invention provides a solid-state rotational rate sensor device formed by thin films for generating an electrical signal output proportional to the rate of rotational motion. The precision thin-film piezoelectric elements are configured and arranged on a semi-rigid structure to detect rotation (such as pitch, roll, and yaw) while rejecting spurious noise created by vibration, thermal gradients, and electromagnetic interference.

Figure 1:
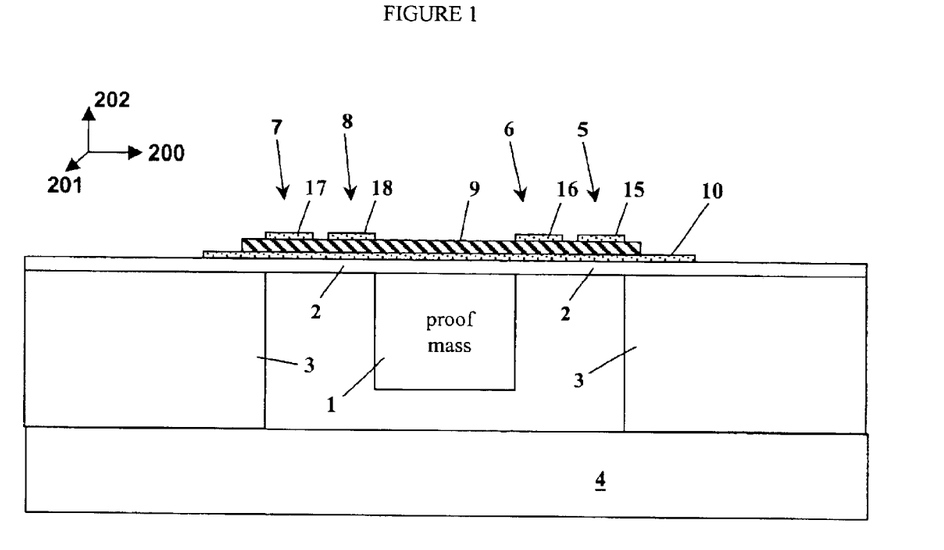
FIG. 1 is a cross-sectional view of one embodiment of a solid-state rate sensor device, in accordance with the principles of the present invention.

The main features of one embodiment of a rotational rate sensor device (also referred to as "gyro") are shown in FIG. 1. The device includes a) a cylindrical silicon proof-mass 1 that is suspended on b) a toroidal thin-film membrane 2 on which are c) a series of thin-film piezoelectric elements 5, 6, 7, and 8. Typically, the height of the proof-mass 1 is about 500 microns, the diameter of the proof-mass 1 is about 400 microns, while the outer diameter of the membrane 2 toroid is about 700 microns. The membrane 2 can be realized with a variety of different materials that exhibit flexibility, resistance to fatigue, and good thermal expansion match to the surrounding silicon substrate 3. The silicon substrate 3 is mounted on a base support 4. Preferred materials for the membrane 2 are single-crystal silicon, polycrystalline silicon, and silicon nitride with a typical thickness of about 1 micron. However, some high frequency or high range sensors would utilize a much thicker membrane 2. The device depicted in FIG. 1 has four (4) separate piezoelectric elements (5–8) that share a common piezoelectric film 9 and a lower conductive layer or electrodes 10, but are delineated by the separate upper electrodes (15–18). The piezoelectric elements 5–8 are formed from a single conductive layer (preferably platinum about 0.1 microns thick) that forms a common lower layer 10, a single layer of piezoelectric thin film 9 (preferably PZT about 1 micron thick), and separate upper conductive electrodes 15–18. By utilizing a single common layer for the lower layer 10 and piezoelectric film 9, matching between elements and element density is increased; these factors improve the rate sensor's signal fidelity. The piezoelectric elements are defined by upper conductive electrodes 15, 16, 17, and 18 (preferably platinum about 0.1 microns thick). Each piezoelectric element is comprised of an upper conductive electrode along with a portion of the piezoelectric film and a lower conductive electrode that reside beneath the upper conductive electrode. For example, the piezoelectric element 5 is comprised of the electrode 15 along with a portion of piezoelectric film and a lower conductive electrode that reside beneath the electrode 15. Since the piezoelectric film 9 is non-conductive, each piezoelectric element 5–8 is defined by the upper conductive electrodes 15–18 alone, and electrical interaction between piezoelectric elements is negligible.

Figure 2:
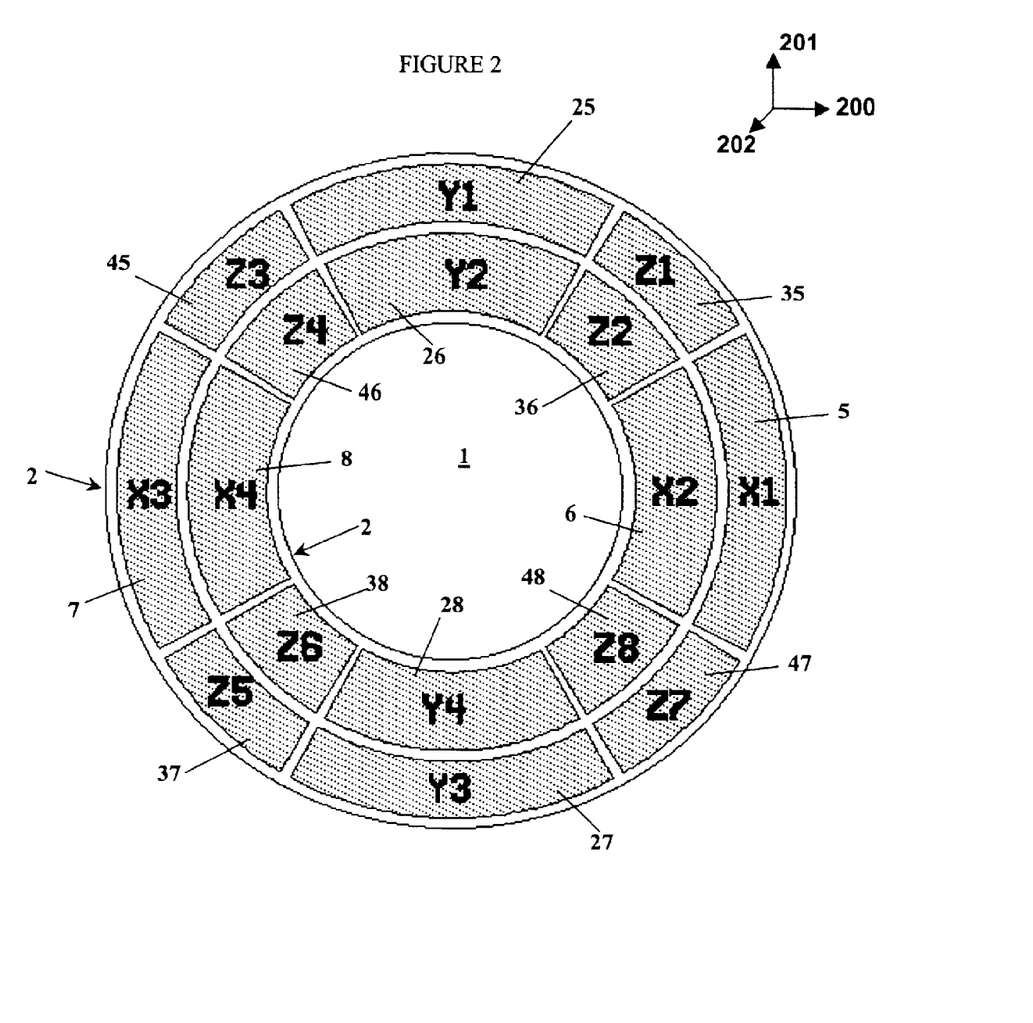
FIG. 2 is a top view of one embodiment of the solid-state rate sensor device showing one arrangement of piezoelectric element placement.

A first embodiment of piezoelectric element configuration for a solid-state rotational rate sensor device is detailed in FIG. 2, and it includes matched differential element pairs (i.e. 5 and 6) that reside on adjacent inner and outer regions of the membrane toroid 2. Each differential element pair is configured for optimal matching; they have identical electrode area, are placed at minimum spacing, and are symmetrically located on the semi-rigid toroidal membrane 2. In addition, an identical mirror-image differential element pair is located on the opposite side of the proof-mass 1 (i.e. pair 5/6 and pair 7/8 represent a mirror-image pair). During operation as a sensor, these 4-element mirror-image pairs will selectively generate differential voltages associated with motion along a single coordinate axis. During operation as an actuator, these 4-element mirror-image pairs will selectively generate motion along a single coordinate axis. Whether operated as a sensor or actuator, the differential nature and symmetric placement along the coordinate axes allows motion in other directions to be rejected, thereby increasing the signal accuracy. The amount of "off-axis rejection" is strongly related to a) the symmetry b) matching of the elements, and c) precision placement. These are some of the key advantages of the present invention that yield dramatically improved performance over the existing rate sensor devices. A multitude of additional electrode configurations can be used within the scope of the present invention and are known in the electrical art. The arrangement of FIG. 2 depicts one of many suitable centro-symmetric (symmetry in a cylindrical coordinate system) arrangements of differential piezoelectric elements.

Figure 3:
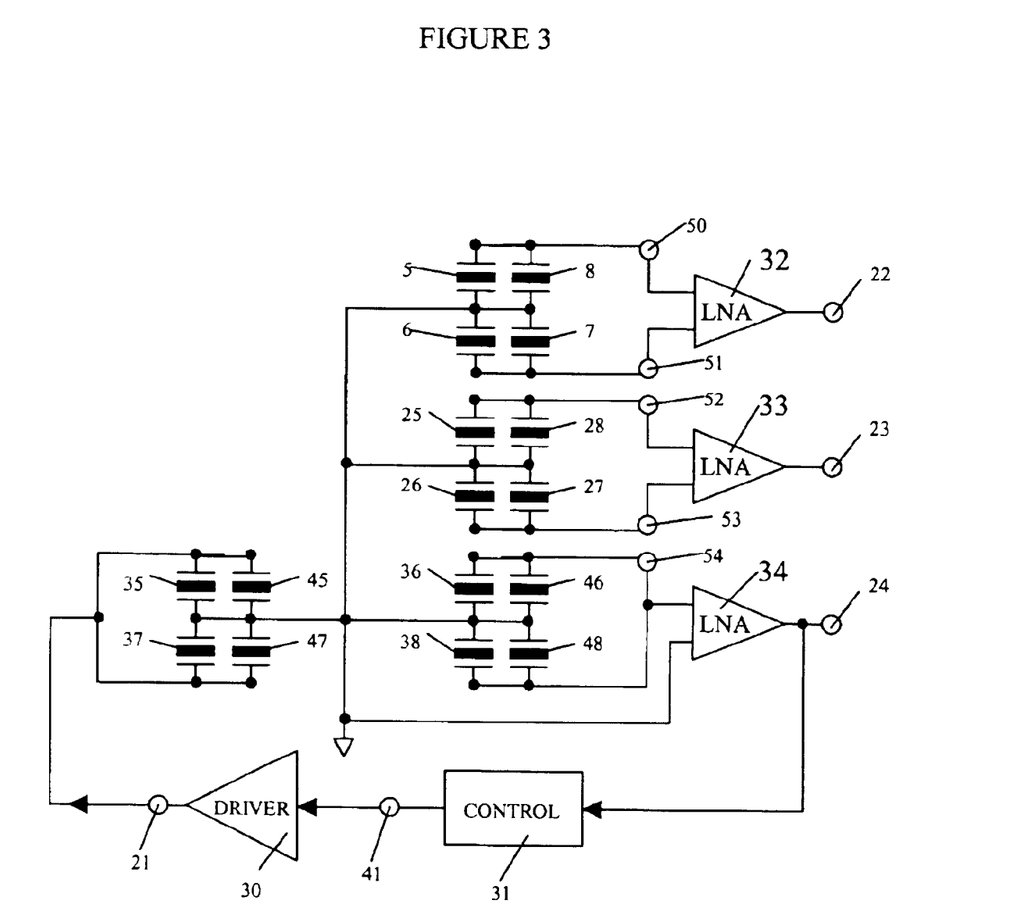
FIG. 3 is a block diagram of one embodiment of a two-axis solid-state rate sensor device electrical configuration for simple parallel connection of symmetric and differential elements with feedback for z-axis vibration control, illustrating single-ended actuator drive and actuator sense.

Operation of a rate sensor device shown in FIGS. 1 and 2 is based on the Coriolis Effect, a derivative of Newton's first law of motion. In a first mode of operation, the device is connected electrically to several electronic components as shown in FIG. 3. In the electrical configuration of FIG. 3, a periodic voltage 21 is applied simultaneously by a voltage driver circuit 30 to elements 35, 45, 37, and 47. By the secondary piezoelectric effect, the membrane 2 under these four Z-elements is deflected or bent, and the proof mass is driven into vibration along the direction 202 (perpendicular to the surface, see FIG. 2) at the same periodic rate as the applied voltage 21. If a rotation motion is applied to the rate sensor around the direction 200, a Coriolis force forms in the direction 201. Similarly, if a rotation motion is applied to the rate sensor around the direction 201, a Coriolis force forms in the direction 200. The Coriolis force is proportional to the weight of the proof-mass 1, the oscillation frequency, the magnitude of oscillation, and the rate of rotation.

The piezoelectric elements 5, 6, 7, and 8 (elements 5–8) detect the Coriolis force along the direction 200 that is associated with rotation about the direction 201, and generate a differential pair of electrical signals 50 and 51, the difference being proportional to the rotational rate. A low-noise amplifier (LNA) 32 boosts/amplifies the level of the differential electrical signals 50 and 51 from elements 5–8 to create an output signal 22. The piezoelectric elements 25, 26, 27, and 28 (elements 25–28) detect the Coriolis force along the direction 201 that is associated with rotation about the direction 200, and generate a differential pair of electrical signals 52 and 53 in proportion to the rotational rate. A low-noise amplifier (LNA) 33 boosts the level of the signal electrical signal 52 and 53 from the elements 25–28 to create an output signal 23. In the embodiment of FIGS. 1–3, elements 36, 46, 38, and 48 are connected together and operate as sensors that generate a single-ended electrical signal 54 proportional to the vibration along the direction 202.

A low-noise amplifier 34 boosts the level of the electrical signal 54 from the elements 36, 46, 38, and 48 to create an output reference signal 24. Control electronics 31 process the electrical signal 24 by adding appropriate signal gain (or attenuation), and phase shift such that a stable periodic signal is sent to the voltage driver circuit 30. This feedback mode of operation provides immunity to temperature variation and other environmental anomalies and improves the overall fidelity of the rate sensor performance. Again, the quality of piezoelectric matching and symmetry enable this mode of operation.

In the embodiment of FIGS. 1–3 and many other embodiments of the present invention, it may be desirable to drive an actuator (elements 35, 37, 45, and 47) at the fundamental mechanical resonant frequency associated with proof-mass 1 motion in the direction 202. Operation at the resonant frequency provides a maximum amount of motion with the minimum applied signal voltage. According to the primary piezoelectric effect and details of the mechanical resonant behavior, the amplitude and phase of the output electrical signal 24 shift relative to the applied drive voltage 21 at the associated mechanical resonant frequency.

The control electronics 31 provide appropriate phase shift and electrical signal gain (according to the Nyquist criteria) to selectively force the periodic signal to match the mechanical resonant frequency. The details of the control electronics 31 are well understood in the field and not a subject of the present invention.

It is noted that the embodiment shown in FIGS. 1–3 and described above may be varied because the actuation contributed by the elements 35, 37, 45, and 47 is driven with the single-ended signal 21, and the actuation sense contributed by the elements 36, 38, 46, and 48 provides the single-ended electrical signal 54. Single-ended signals do not generally provide optimal signal fidelity. A single-ended arrangement is responsive to the intended oscillation, but it is also responsive to a multitude of other unintended artifacts, such as stray electric fields, acceleration, temperature, package strain, capacitive charge injection, etc. Furthermore, the single-ended actuator arrangement may not optimally match the resonant vibration pattern.

A differential arrangement can be configured to reject most signals except for the intended oscillation response, thereby improving the fidelity and selectivity of the rate sensor. Improved overall device performance can be achieved if either the actuator (elements 35, 37, 45, 47 in FIG. 3), the actuator sense (elements 36, 38, 46, 48 in FIG. 3), or both are instead implemented in a differential configuration. In a preferred embodiment for a single-axis rate sensor, the device depicted in FIGS. 1–2 is connected to the electrical circuit as shown in FIG. 4 to achieve both a differential actuator and differential actuator sense.

Figure 4:
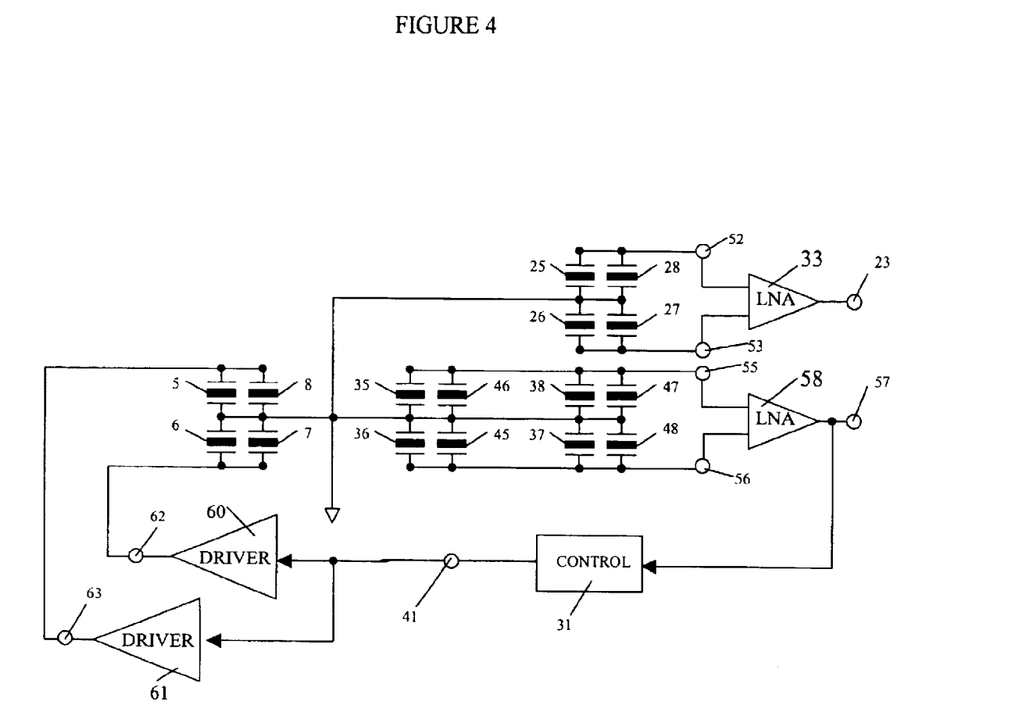
FIG. 4 is a block diagram of another embodiment of an one-axis solid-state rate sensor device electrical configuration for simple parallel connection of symmetric and differential elements with feedback for in-plane vibration control using electrode configuration of FIG. 2, illustrating differential actuator drive and actuator sense.

In the electrical configuration of FIG. 4, the control electronics 31 apply a periodic control signal 41 to a non-inverting voltage driver circuit 60 and an inverting voltage driver circuit 61. The non-inverting voltage driver circuit 60 generates a positive actuator drive electrical signal 62 that is connected to actuator elements 6 and 7. The inverting voltage driver circuit 61 generates a negative actuator drive electrical signal 63 that is connected to actuator elements 5 and 8, and is approximately 180 degrees out of phase with 62. By the secondary piezoelectric effect, the membrane under the elements 6 and 7 is bent upward (or downward) while the membrane under the elements 5 and 8 is bent downward (or upward). The net result is a tilting of the proof mass 1 (shown in FIG. 1) along the direction 200. As the periodic control signal 41 alternates, the proof mass 1 oscillates along the direction 200 in proportion to and at the oscillation rate of the periodic control system 41. If the device is electrically configured as shown in FIG. 4 with the proof mass 1 oscillation along the direction 200 and a rotational motion is applied to the rate sensor around the direction 202, a Coriolis force forms in the direction 201. The Coriolis force is proportional to the weight of the proof-mass 1, the oscillation frequency, the magnitude of oscillation, and the rate of rotation. The piezoelectric elements 25, 26, 27, and 28 generate a differential pair of electrical signals 52 and 53 proportional to the Coriolis force along the direction 201 that is associated with rotation about the direction 202.

A low-noise amplifier 33 boosts the differential electrical signals 52 and 53 to create an output signal 23 which is proportional to the rate of rotational motion about the direction 202.

In the embodiment of FIG. 4 (reference to FIG. 1), the elements 35–38 and 45–48 create the actuation sense function and are connected in a differential arrangement to generate differential electrical signals 55 and 56 proportional to the vibration along the direction 200. With the piezoelectric element embodiment of FIG. 2 connected as shown in FIG. 4, the elements 35, 46, 38, and 47 mirror the behavior of the actuator elements 5 and 8. For instance, the elements 35, 46, 38, and 47 are bent upward when the actuator elements 5 and 8 are bent upward, and the elements 35, 46, 38, and 47 are bent downward when the actuator elements 5 and 8 are bent downward. Similarly, with the piezoelectric element embodiment of FIG. 2 connected as shown in FIG. 4, the elements 36, 45, 37, and 48 mirror the behavior of the actuator elements 6 and 7. For instance, the elements 36, 45, 37, and 48 are bent upward when the actuator elements 6 and 7 are bent upward, and the elements 36, 45, 37, and 48 are bent downward when the actuator elements 6 and 7 are bent downward. Collectively, the elements 35–38 and 45–48 generate the differential actuation sense electrical signals 55 and 56 which are subsequently boosted by a low-noise amplifier 58 to create an output reference signal 57.

Control electronics 31 process the electrical signal 57 by adding appropriate signal gain (or attenuation) and phase shift such that a stable periodic signal is sent to the voltage driver circuits 60 and 61. This feedback mode of operation provides immunity to temperature variation and other environmental anomalies and improves the overall fidelity of the rate sensor performance. Again, the quality of piezoelectric matching and symmetry enable this mode of operation.

In the embodiment of FIG. 4 and many other embodiments of the present invention, it may be desirable to drive the actuator elements 5, 6, 7, 8 at the fundamental mechanical resonant frequency associated with the proof-mass 1 motion in the direction 200. Operation at the resonant frequency provides a maximum amount of motion with the minimum applied signal voltage. According to the primary piezoelectric effect and details of the mechanical resonant behavior, the amplitude and phase of the 57 signal shift relative to the periodic control signal 41 at the mechanical resonant frequency along the direction 200. The control electronics 31 provide appropriate phase shift and electrical signal gain (according to the Nyquist criteria) to selectively force the periodic signal to match the mechanical resonant frequency along the direction 200. The details of the control electronics 31 are well understood in the field and not a subject of the present invention.

Figure 5:
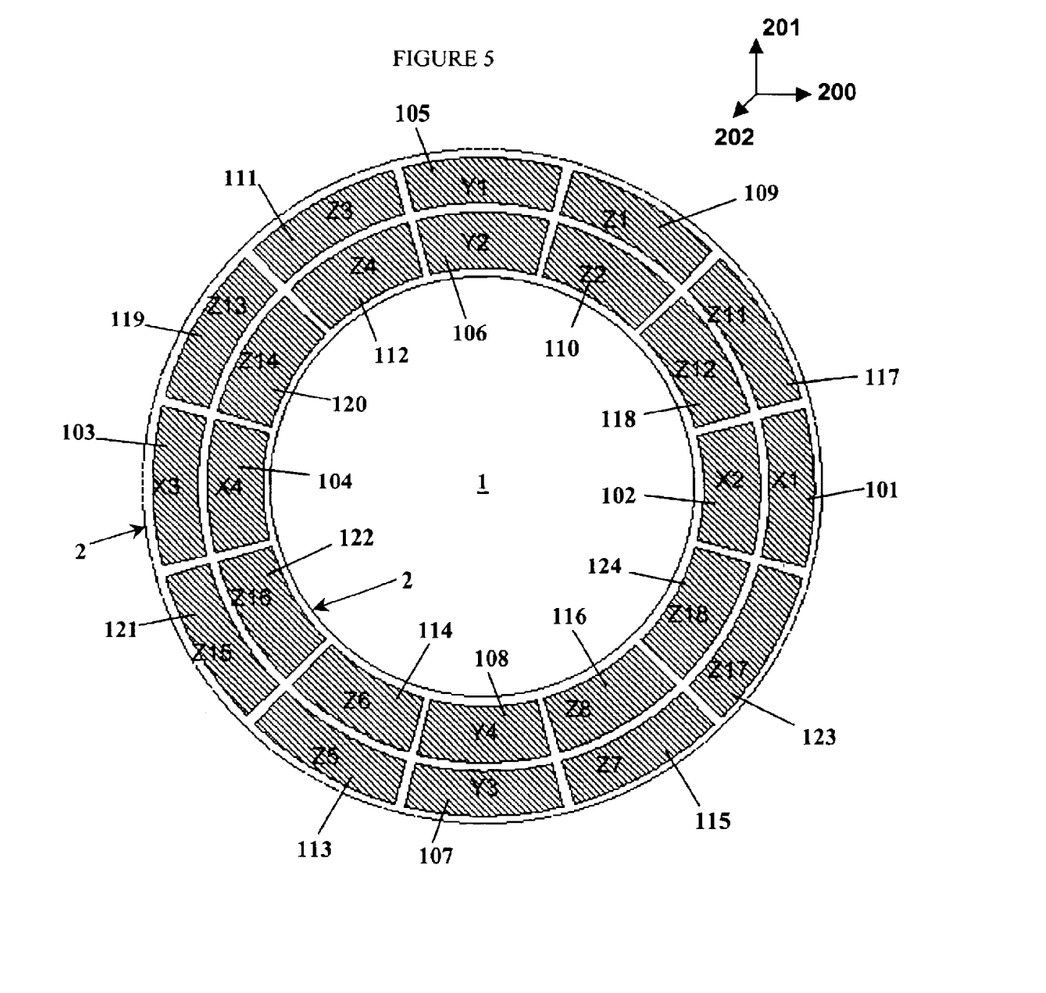
FIG. 5 is a top view of one embodiment of a solid-state rate sensor device showing another arrangement of piezoelectric element placement.
Figure 6:
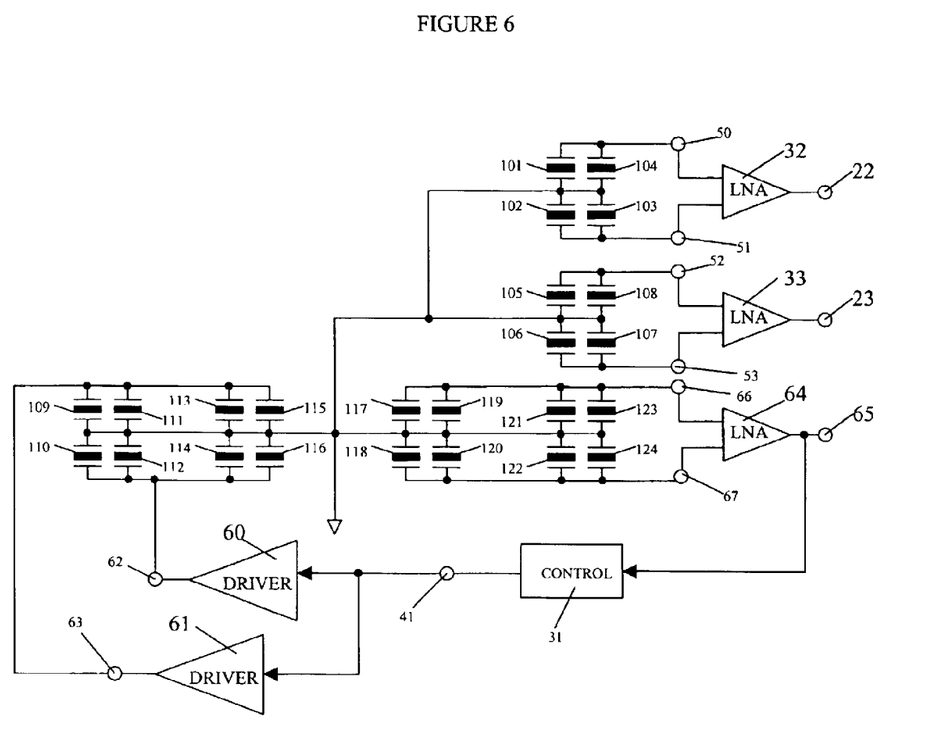
FIG. 6 is a block diagram of one embodiment of a two-axis solid-state rate sensor device electrical configuration for simple parallel connection of symmetric and differential elements with feedback for out-of-plane vibration control using electrode configuration of FIG. 5, illustrating differential actuator drive and actuator sense.

In a preferred embodiment for a dual-axis rate sensor, the device depicted in FIGS. 1 and 5 is connected to the electrical circuit shown in FIG. 6 to achieve both a differential actuator and differential actuation sense. In the electrical configuration of FIG. 6, the control electronics 31 apply a periodic control signal 41 to a non-inverting voltage driver circuit 60 and an inverting voltage driver circuit 61. The non-inverting voltage driver circuit 60 generates a positive actuator drive electrical signal 62 that is connected to actuator elements 110, 112, 114, and 116. The inverting voltage driver circuit 61 generates a negative actuator drive electrical signal 63 that is connected to actuator elements 109, 111, 113, and 115, and is approximately 180 degrees out of phase with the positive actuator drive electrical signal 62. By the secondary piezoelectric effect, the membrane under the actuator elements 109, 111, 113, and 115 is bent upward (or downward) while the membrane under the actuator elements 110, 112, 114, and 116 is bent downward (or upward). The net result is a deflection of the proof mass 1 (shown in FIG. 1) along the direction 202. As the periodic control signal 41 alternates, the proof mass 1 oscillates along the direction 202 in proportion to and at the oscillation rate of the periodic control signal 41.

If the device is electrically configured as shown in FIG. 6 with the proof mass 1 oscillation along the direction 202 and a rotational motion is applied to the rate sensor around the direction 200, a Coriolis force forms in the direction 201. The Coriolis force is proportional to the weight of the proof-mass 1, the oscillation frequency, the magnitude of oscillation, and the rate of rotation. The piezoelectric elements 105, 106, 107, and 108 generate differential electrical signals 52 and 53 proportional to the Coriolis force along the direction 201 that is associated with rotation about the direction 200.

A low-noise amplifier 33 boosts the level of the differential electrical signals 52 and 53 to create an output signal 23 which is proportional to the rate of rotational motion about the direction 200.

If the device is electrically configured as shown in FIG. 6 with the proof mass 1 oscillation along the direction 202 and a rotational motion is applied to the rate sensor around the direction 201, a Coriolis force forms in the direction 200. The Coriolis force is proportional to the weight of the proof-mass 1, the oscillation frequency, the magnitude of oscillation, and the rate of rotation. The piezoelectric elements 101, 102, 103, and 104 generate differential electrical signals 50 and 51 proportional to the Coriolis force along the direction 200 that is associated with rotation about the direction 201.

A low-noise amplifier 32 boosts the differential electrical signals 50 and 51 to create an output signal 22 which is proportional to the rate of rotational motion about the direction 201.

In the embodiment of FIG. 6 (reference to FIGS. 1 & 5), elements 117–124 create the actuator sense function and are connected in a differential arrangement to generate differential electrical signals 66 and 67 proportional to the vibration along the direction 202. With the piezoelectric element embodiment of FIG. 5 connected as shown in FIG. 6, the elements 117, 119, 121, and 123 mirror the behavior of the actuator elements 109, 111, 113, and 115. For instance, the elements 117, 119, 121, and 123 are bent upward when the actuator elements 109, 111, 113, and 115 are bent upward, the elements 117, 119, 121, and 123 are bent downward when the actuator elements 109, 111, 113, and 115 are bent downward. Similarly, with the piezoelectric element embodiment of FIG. 5 connected as shown in FIG. 6, the elements 118, 120, 122, and 124 mirror the behavior of the actuator elements 110, 112, 114, and 116. For instance, the elements 118, 120, 122, and 124 are bent upward when the actuator elements 110, 112, 114, and 116 are bent upward, and the elements 118, 120, 122, and 124 are bent downward when the actuator elements 110, 112, 114, and 116 are bent downward. Collectively, the elements 117–124 generate the differential actuator sense electrical signals 66 and 67 which are subsequently boosted by a low-noise amplifier 64 to create an output reference signal 65.

Control electronics 31 process the output reference electrical signal 65 by adding appropriate signal gain (or attenuation) and phase shift such that a stable periodic signal is sent to the voltage driver circuits 60 and 61. This feedback mode of operation provides immunity to temperature variation and other environmental anomalies and improves the overall fidelity of the rate sensor performance. Again, the quality of piezoelectric matching and symmetry enable this mode of operation.

In the embodiment of FIG. 6 and many other embodiments of the present invention, it may be desirable to drive the actuator elements 109–116 at the fundamental mechanical resonant frequency associated with the proof-mass 1 motion in the direction 202. Operation at the resonant frequency provides a maximum amount of motion with the minimum applied signal voltage. According to the primary piezoelectric effect and details of the mechanical resonant behavior, the amplitude and phase of the signal 65 shifts relative to the periodic control signal 41 at the mechanical resonant frequency of motion along the direction 202.

Control electronics 31 provide appropriate phase shift and electrical signal gain (according to the Nyquist criteria) to selectively force the periodic signal 41 to match the mechanical resonant frequency. The details of the control electronics 31 are well understood in the field and not a subject of the present invention.

In the discussion of rate sensor operation, circuit operation, and piezoelectric effects, the terms "voltage" and "electrical signal" have been used intermittently. In general, "electrical signal" is a general term that may describe an electric potential difference (or voltage), an electrical current, or an electrical charge. Depending on the details of the electric circuits connected to the rate sensor (such as "LNA", "control electronics", and "voltage driver circuits"), the actual electrical signals involved in rate sensor operation may be best described as a "voltage", a "current", or a "charge". For instance, the low noise amplifiers may be implemented with voltage amplifiers in which case the electrical signals generated by the piezoelectric sensors is best described as a voltage. Conversely, the low noise amplifiers may be implemented with charge amplifiers in which case the electrical signals generated by the piezoelectric sensors is best described as a charge or current. The terminology used herein with respect to electrical signals is not intended to limit the scope of the present invention.

Operation of the rate sensor at the mechanical resonant frequency along the drive (actuator) axis provides maximum performance since the Coriolis output signal is proportional to the amplitude of oscillation along the actuator axis (the direction 200 in FIG. 2). The control electronics 31 in FIGS. 4 and 6 ensure mechanical vibration at actuator axis resonant frequency. Additionally, Coriolis signal can be further increased if the device can simultaneously be operated at the mechanical resonant frequency associated with the axis along which Coriolis force is detected. In FIG. 4, for instance, the output response 23 to rotation around the direction 202 is maximized if the actuator is operating simultaneously at the resonant frequencies of the direction 200 and direction 201. Maximum output signal is achieved if the two resonant frequency modes (along drive axis and sense axis) are perfectly matched. The symmetry of the rate sensor depicted in FIGS. 1, 2, and 5 along with thin-film manufacturing methods provide excellent matching of the drive and sense resonant frequencies; typically within 0.1%. However, a method for electronically tuning the resonant frequencies is desirable to maintain a perfect match throughout manufacturing variations and operating conditions.

A further embodiment of the present invention is a method for tuning the mechanical resonant frequencies of a rate sensor, primarily to match the resonant frequencies along the actuator axis and Coriolis force detection axis. As discussed above, application of a voltage to the piezoelectric elements causes a mechanical deformation or stress in the material according to the secondary piezoelectric effect. This effect is utilized in all embodiments of the present invention wherein a periodic voltage is applied to selected piezoelectric elements to create a corresponding periodic motion along the actuator axis. It is further possible to apply a constant or slowly changing voltage bias to some piezoelectric elements, thereby creating more or less mechanical stress. Such an applied voltage bias shifts the amount of mechanical stress and also shifts the resonant frequency.

In FIG. 4, for instance (reference to FIG. 2), application of a voltage bias superimposed on the periodic actuator drive electrical signals 62 and 63 shifts the fundamental resonant frequency along the direction 200. In a preferred embodiment of the present invention shown in FIG. 7, a pair of voltage summing circuits 75 and 76 combine a voltage bias 81 with the periodic actuator drive electrical signals 62 and 63. The summing circuits 75 and 76 generate the drive signals 82 and 83. Such summing circuits are common in the field and will not be detailed further. There are many ways to generate the bias voltage 81, including simple analog circuitry, filtering, and digital signal processing.

Figure 7:
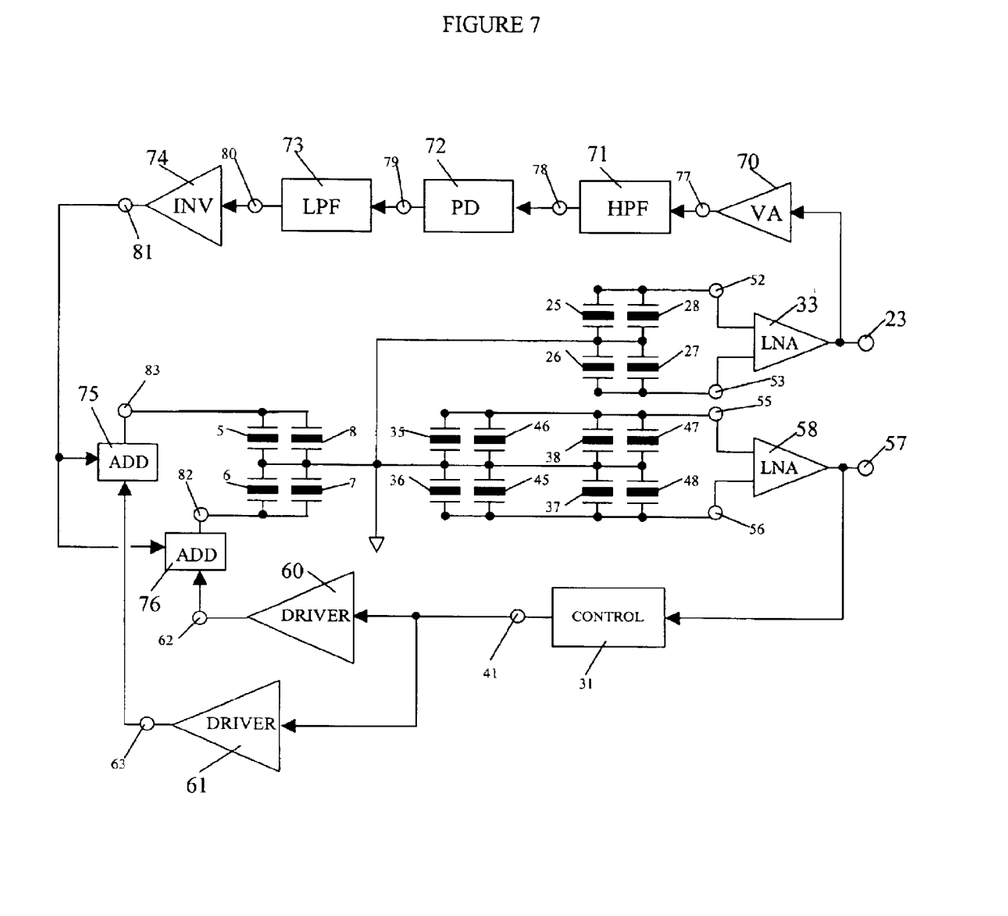
FIG. 7 is a block diagram of one embodiment of an one-axis solid-state rate sensor device electrical configuration of FIG. 4 with addition of bias voltage circuitry for resonant frequency shifting.

In a preferred embodiment also shown in FIG. 7, the Coriolis output signal 23 is first amplified by a voltage amplifier 70, filtered by a high-pass filter 71, normalized with a peak detect circuit 72, filtered by a low-pass filter 73 and finally inverted by an inverter 74 to generate the voltage bias signal 81. The circuit configuration in FIG. 7 provides a bias voltage 81 that is inversely proportional to the amplitude of oscillation along the direction 201. The filter poles in 71 are set (typically about 1 kHz) to ensure that variations in the signal 23 associated with rotational motion around the direction 202 (rate signal output) do not affect the voltage bias 81. The peak detector 72 converts the periodic signal to a slowly varying signal proportional to the amplitude at the signal 23. The low pass filter 73 poles are set (typically about 0.1 Hz) to ensure that the voltage bias 81 is slowly varying and does not corrupt normal operation of the rate sensor.

Rate sensors in the existing devices and the embodiments of the present invention described above all generate an output signal at a frequency matching the actuator drive and amplitude that is proportional to the rotational rate (such as the output signals 22 and 23 in FIGS. 3, 4, and 6). Resolution with these existing devices is limited by the smallest signal that can be resolved at the output signal 23 relative to the random noise. Furthermore, the amplitude of the output signal is affected by other phenomena such as temperature changes, package strain, and vibration. A further subject of the present invention is an alternative method for extracting the rotational rate electrical signal above the random noise. In the embodiments of FIGS. 1–7, further post-processing of the Coriolis output signals 22 and 23 and actuator reference electrical signals 24, 57, and 65 with a phase-shift detection circuit provides additional immunity to random noise. Furthermore, signal processing of the Coriolis output signals 22 and 23 with a phase-shift detection scheme minimizes overall system dependence on factors such as temperature and manufacturing variations. These features provide improved signal fidelity and stability of the rate sensor system.

With each of the embodiments shown in FIGS. 1–7, the phase of the Coriolis output signals 22 and 23 relative to the actuator reference signals 24, 57, and 65 shifts linearly in response to the rotational rate of the sensor. For example, in the embodiment of FIG. 4, the actuator elements 5, 6, 7, and 8 are configured for mechanical oscillation along the direction 200 and the output signal 23 is responsive to rotational motion around the direction 202. That is, as the rate sensor is rotated around the direction 202 the phase of the output signal 23 will shift relative to the actuator reference signal 57, the amount of phase shift being in proportion to the rate of rotation. Similarly, in the embodiment of FIG. 6 (reference to FIG. 5), the actuator elements 109–116 are configured for mechanical oscillation along the direction 202, and the Coriolis output signal 23 phase shifts relative to the actuator reference output signal 65 when the rate sensor is subject to rotational motion around the direction 200. Also in the embodiment of FIG. 6 (reference to FIG. 5), the actuator elements 109–116 is configured for mechanical oscillation along the direction 202, and the Coriolis output signal 22 phase shifts relative to the actuator reference output signal 65 when the rate sensor is subject to rotational motion around the direction 201. A feature of the present invention is an improved method for capturing the rotational rate signal that improves resolution, stability, and tolerance to environmental anomalies.

Figure 8:
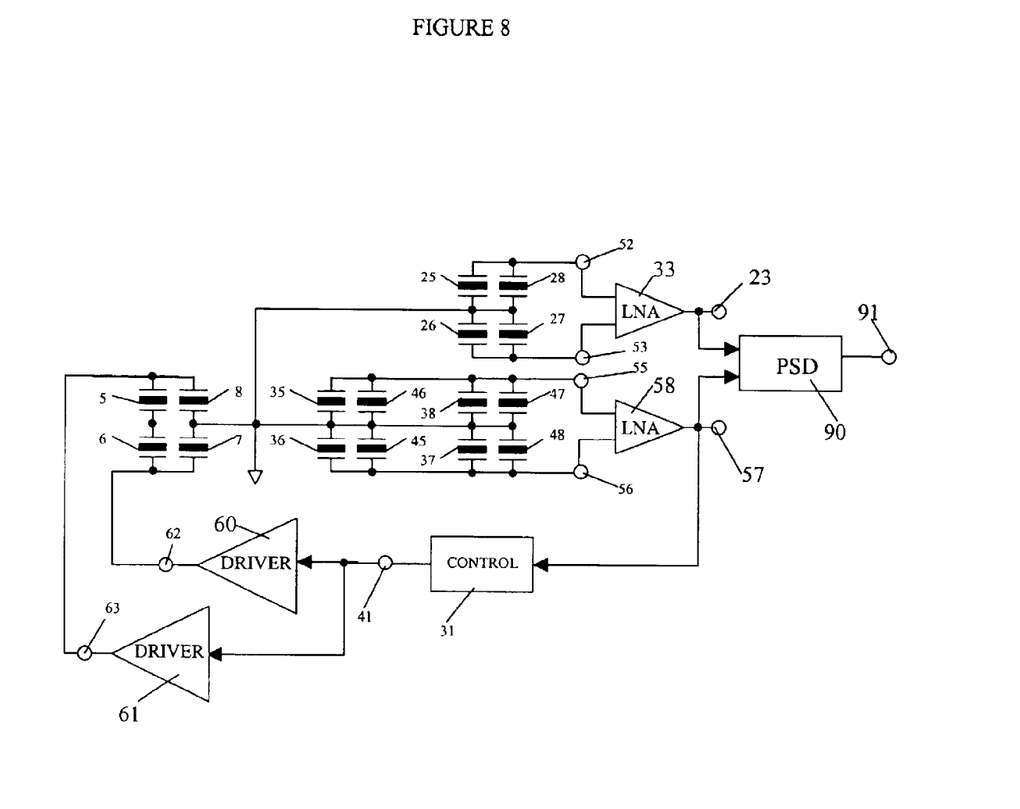
FIG. 8 is a block diagram of one embodiment of an one-axis solid-state rate sensor device electrical configuration for phase shift detection using a differential actuator drive and differential actuator sense.

In a preferred embodiment of the present invention shown in FIG. 8, a phase-shift detection circuit 90 compares the phase of Coriolis output signal 23 with the phase of actuator reference output signal 57 and generates a third electrical output signal 91 in proportion to the phase difference. Operation of the system in FIG. 8 is generally identical to the embodiment of FIG. 4 with the addition of the phase-shift detection circuit 90. The device depicted in FIGS. 1–2 is connected to the electrical circuit shown in FIG. 8 to achieve both a differential actuator and differential actuator sense.

In the electrical configuration of FIG. 8, the control electronics 31 apply a periodic control signal 41 to a non-inverting voltage driver circuit 60 and an inverting voltage driver circuit 61. The non-inverting voltage driver circuit 60 generates a positive actuator drive electrical signal 62 that is connected to the actuator elements 6 and 7. The inverting voltage driver circuit 61 generates a negative actuator drive electrical signal 63 that is connected to actuator elements 5 and 8, and is approximately 180 degrees out of phase with the positive actuator drive electrical signal 62. By the secondary piezoelectric effect, the membrane under the actuator elements 6 and 7 is bent upward (or downward) while the membrane under the actuator elements 5 and 8 is bent downward (or upward). The net result is a tilting of the proof mass 1 (shown in FIG. 1) along the direction 200. As the periodic control signal 41 alternates, the proof mass 1 oscillates along the direction 200 in proportion to and at the oscillation rate of the periodic control signal 41.

If the device is electrically configured as shown in FIG. 8 with the proof mass 1 oscillation along the direction 200 and a rotational motion is applied to the rate sensor around the direction 202, a Coriolis force forms in the direction 201. The Coriolis force is proportional to the weight of the proof-mass 1, the oscillation frequency, the magnitude of oscillation, and the rate of rotation. The piezoelectric elements 25, 26, 27, and 28 generate differential electrical signals 52 and 53 related to the Coriolis force along the direction 201 that is associated with rotation about the direction 202.

A low-noise amplifier 33 boosts the level of the differential electrical signals 52 and 53 to create a Coriolis output signal 23 which has phase shift relative to an actuator reference output 57 proportional to the rate of rotational motion about the direction 202.

In the embodiment of FIG. 8 (reference to FIGS. 1 & 2), the elements 35–38 and 45–48 create the actuator sense function and are connected in a differential arrangement to generate differential electrical signals 55 and 56 proportional to the vibration along the direction 200. Collectively, the elements 35–38 and 45–48 generate the differential actuator sense electrical signal 55 and 56 which is subsequently boosted by a low-noise amplifier 58 to create the output actuator reference signal 57.

Control electronics 31 process the output actuator reference electrical signal 57 by adding appropriate signal gain (or attenuation) and phase shift such that a stable periodic signal is sent to the voltage driver circuits 60 and 61 at the mechanical resonant frequency along the direction 200. This feedback mode of operation provides immunity to temperature variation and other environmental anomalies and improves the overall fidelity of the rate sensor performance. Again, the quality of piezoelectric matching and symmetry enable this mode of operation.

Figure 9:
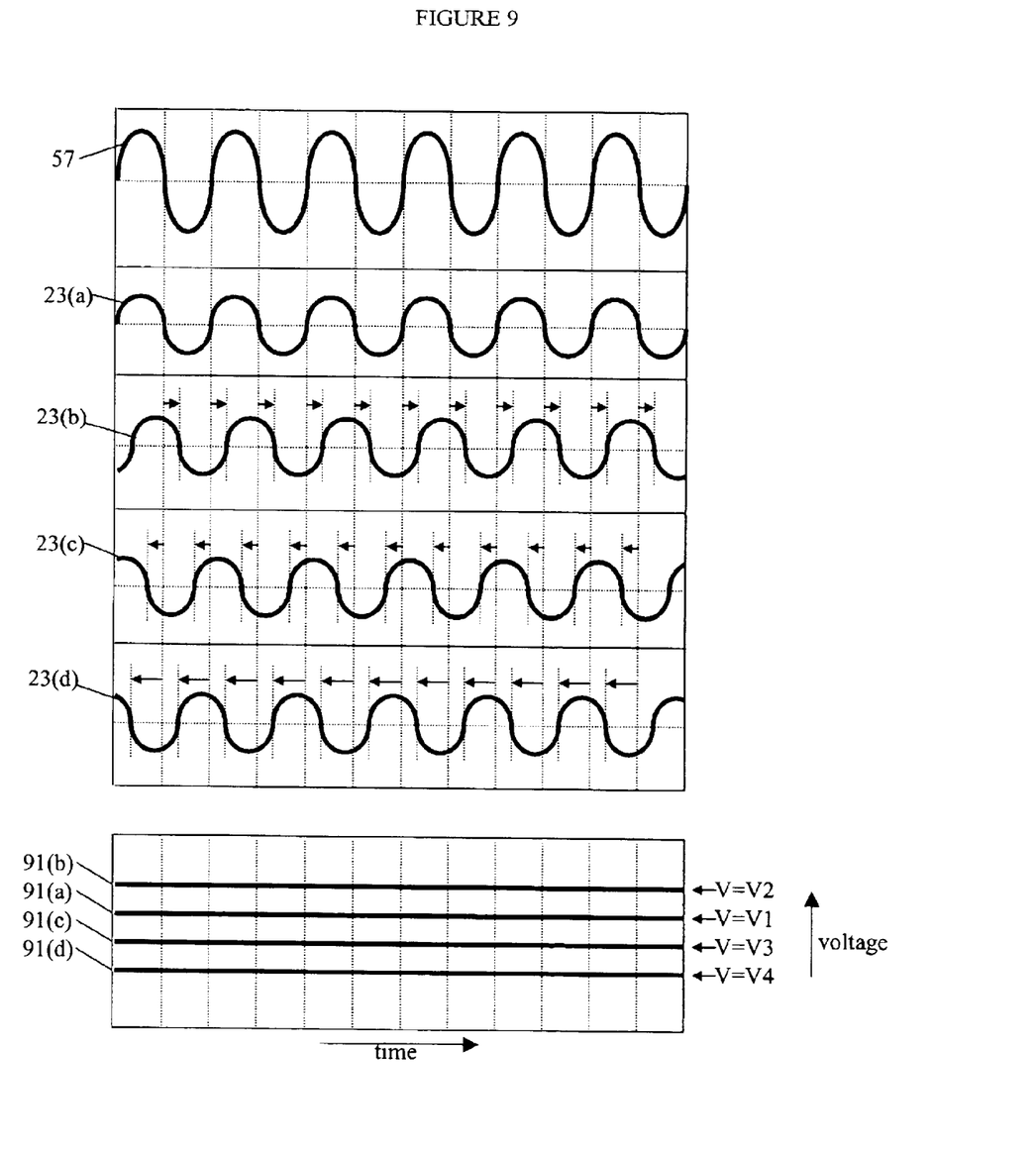
FIG. 9 is a schematic view of phase shift of a rate sensor transverse electrical output signal relative to a rate sensor reference output signal and an associated electrical rate output electrical signal from a phase-shift detector of FIG. 8, illustrating oscillating voltage signals versus time for several different rotational motion conditions operated in an one-axis solid-state rate sensor device, in accordance with the principles of the present invention.

A representation of the phase relationships between Coriolis output signal 23 and actuator reference output 57 is shown in FIG. 9 along with a resulting rate output 91 from the phase-shift detector 90. The phase of the Coriolis output signal 23 relative to the actuator reference output signal 57 shifts linearly in response to the rotational rate of the sensor. For example, in the embodiment of FIG. 8, the actuator elements 5–8 is configured for mechanical oscillation along the direction 200 and the output signal 23 is responsive to rotational motion around the direction 202. When the rate sensor is stationary, the phase of the signal 23 approximates the signal 23(*a*) in FIG. 9 and the rate output 91 approximates an output 91(*a*).

As the rate sensor is rotated clockwise around the direction 202 at a rotational rate of R1, the phase of the signal 23 approximates the signal 23(*b*) in FIG. 9 and the rate output 91 approximates an output 91(*b*). At a clockwise rotational rate of R1 around the direction 202, the signal 23(*b*) phase shifts positive relative to the signal 23(*a*) and the voltage of the output 91(*b*) shifts positive relative to the output 91(*a*). As the rate sensor is rotated counterclockwise around the direction 202 at a rotational rate of R1, the phase of the signal 23 approximates the signal 23(*c*) in FIG. 9 and the rate output 91 approximates the output 91(*c*). At a counterclockwise rotational rate of R1 around the direction 202, the signal 23(*c*) phase shifts negative relative to the signal 23(*a*) and the voltage of the output 91(*c*) shifts negative relative to the output 91(*a*). As the rate sensor is rotated counterclockwise around the direction 202 at a rotational rate of R2>R1, the phase of the signal 23 approximates the signal 23(*d*) in FIG. 9 and the rate output 91 approximates the output 91(*d*). At a counterclockwise rotational rate of R2>R1 around the direction 202, the signal 23(*d*) phase shifts negative relative to both the signals 23(*c*) and 23(*a*), and the voltage of the output 91(*d*) shifts negative relative to both the outputs 91(*c*) and 91(*a*).

In practice, the actuator reference output 57 provides a phase reference for the Coriolis output signal 23. The phase of the output signals 23 and 57 is shown to be zero in FIG. 9 for zero rotational motion, but in practice has a nominal phase offset. Nonetheless, the relative phase shift of the output signal 23 when rotated about the direction 202 is proportional to rotational rate. Similarly, by using the phase-shift detector circuit 90, the voltage shift of rate output 91 is proportional to the rotational rate around the direction 202. The same principle of relative phase shift applies to the embodiments depicted in FIGS. 3, 6, and 7 if the phase-shift detector circuit 90 is implemented; the details will not be repeated here.

There is a multitude of ways to implement a phase-shift detector circuit 90 in the present invention. Implementations common in the existing devices range from simple analog circuits to complex software-driven digital signal processing (DSP). In a preferred embodiment of the present invention, the analog circuit shown in FIG. 10 performs the function of the phase-shift detector (PSD) 90 and generates the rate output signal 91 shown in FIG. 8. Electrical signals internal to the PSD 90 of FIG. 10 are shown in FIG. 11.

Figure 10:
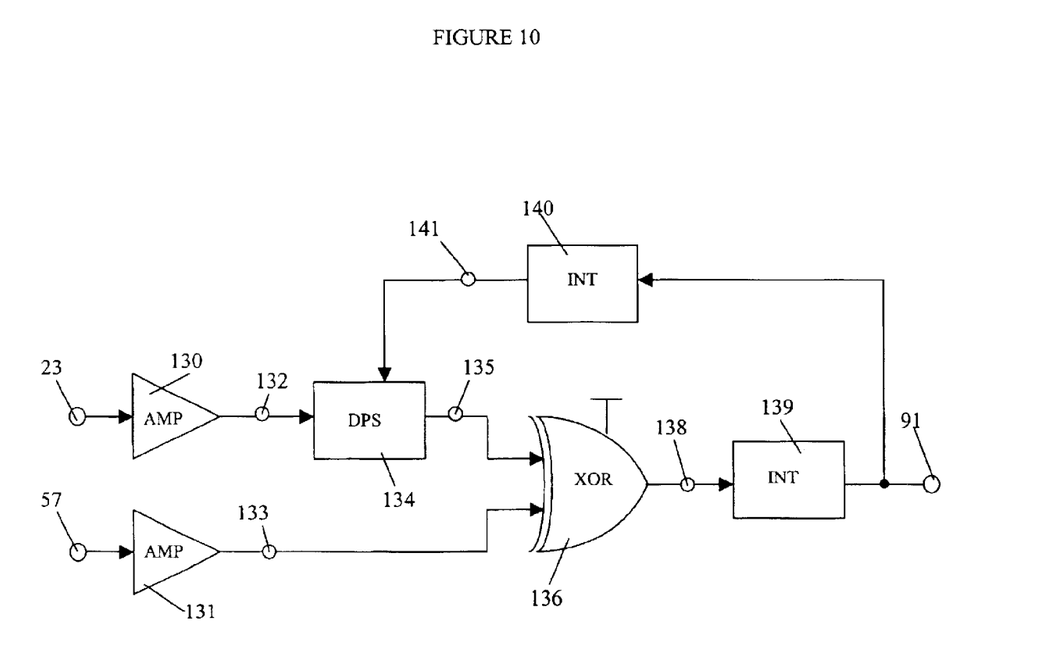
FIG. 10 is a block diagram of an analog phase-shift detector circuit with feedback for output stabilization, in accordance with the principles of the present invention.
Figure 11A:
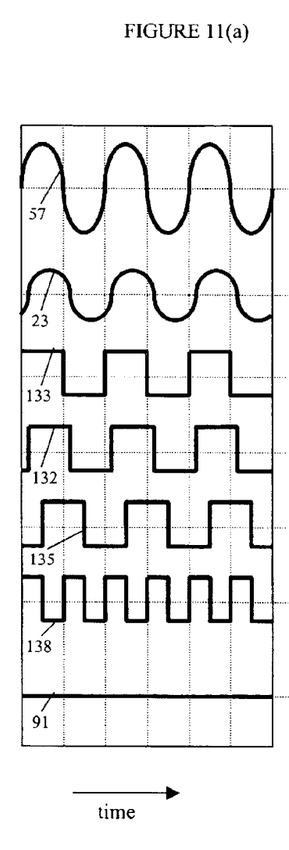
FIGS. 11(a), 11(b), and 11(c) are schematic views of electrical signals in the phase-shift detector circuit of FIG. 10, representing for 11(a) no rotation, 11(b) clockwise rotational, and 11(c) counterclockwise rotation.
Figure 11B:
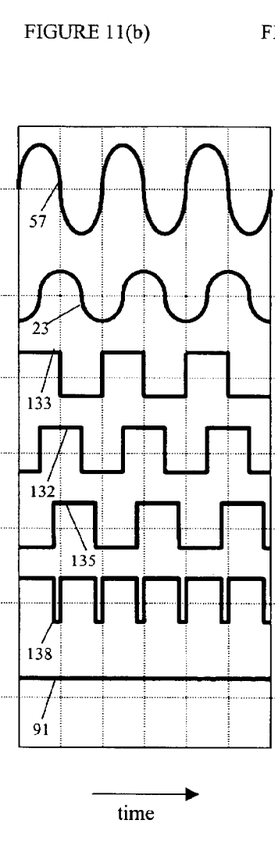
Figure 11C:
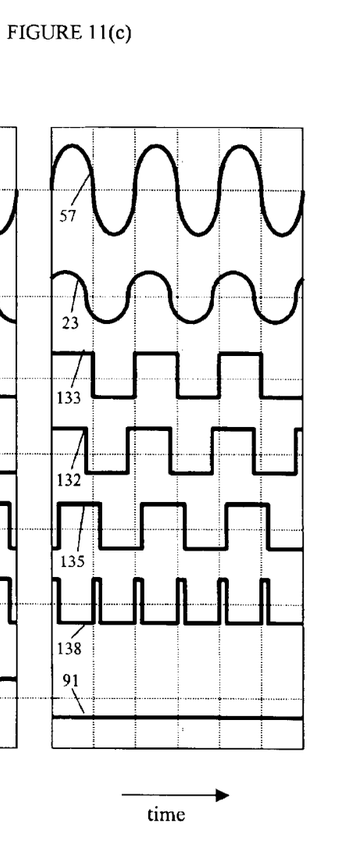

In FIG. 10, a pair of amplifiers 130 and 131 boost the level of Coriolis output signal 23 and actuator reference 57 to generate digitized signals 132 and 133. A digital phase-shifter circuit 134 applies a phase shift 132 to generate 135. The purpose of using the phase-shifter circuit 134 is to null out systematic phase offset of the signal 23 relative to the signal 57. That is, when the rate sensor is stationary, the signals 23 and 57 are generally not phase matched. It may be desirable from a system performance standpoint to have the nominal value of the rate output signal 91 set at a predetermined voltage level and the phase-shifter circuit 134 provides this capability.

The digital signals 135 and 133 are processed through an Exclusive-OR (XOR) digital logic gate 136 that generates an output 138 that is logical "1" when either the signal 135 is positive or the signal 133 is positive. When both the signal 135 and the signal 133 are negative, or when both the signal 135 and the signal 133 are positive, the output 138 is logical "0".

An integrator circuit 139 averages the voltage level over time of 138 to generate the rate output 91. The filter poles of the integrator circuit 139 are set depending on the application requirements. A second integrator circuit 140 further processes the rate output signal 91 to provide feedback signal 141 to the phase shifter 134. The feedback path through the integrator 140 to the phase shifter 134 provides a means for stabilizing the rate output signal 91 to a desired level over a long time period. The filter poles of the integrator circuit 140 are set depending on the application requirements. As an example, if rotational rate changes only between 0.01 Hz and 100 Hz are important for a given application, the filter poles of integrator 139 may be set near 100 Hz and the filter poles of integrator 140 may be set near 0.01 Hz. In effect, the integrator 139 provides a low-pass filter for the rate output signal 91, and the integrator 140 provides a high-pass filter for the rate output signal 91.

There are many ways to implement the phase-shift detection circuit 90 that provide an electrical rate output signal 91 (in FIG. 8) in proportion to the relative phase between two periodic input signals 23 and 57 (in FIG. 8). The preferred embodiment shown in FIG. 10 and described above is one such method and is not intended to limit the scope of the present invention.

From the above description and drawings, it will be understood by those of ordinary skill in the art that the particular embodiments shown and described are for purposes of illustration only and are not intended to limit the scope of the present invention. Those of ordinary skill in the art will recognize that the present invention may be embodied in other specific forms without departing from its spirit or essential characteristics. References to details of particular embodiments are not intended to limit the scope of the invention.

What is claimed is:

1. A solid-state device having a thin-film piezoelectric material forming a plurality of piezoelectric elements on an integrated silicon chip, a first set of the plurality of piezoelectric elements generating a force, and a second set of the plurality of piezoelectric elements generating an electrical signal in proportion to both the force and a rate of rotation of the solid-state device while rejecting spurious noise.

2. A solid-state rotational rate sensor device, comprising:
an integrated silicon chip;
a first set of piezoelectric elements on the silicon chip;
a second set of piezoelectric elements on the silicon chip;
wherein the first set of piezoelectric elements including a piezoelectric material and being actuated by an electrical signal, wherein when the electrical signal is applied n the piezoelectric material, the second set of piezoelectric elements senses rotation of the solid-state rotational rate sensor device.

3. The solid-state rotational rate sensor device of claim 2, wherein the first and second sets of piezoelectric elements are configured on thin-film piezoelectric material.

4. The solid-state rotational rate sensor device of claim 2, further comprising a third set of piezoelectric elements on the silicon chip that sense a force generated by the first set of the piezoelectric elements.

5. The solid-state rotational rate sensor device of claim 4, wherein a signal sensed by at least one set of the second and third sets of piezoelectric elements is fed back to the first set of piezoelectric elements through an electronic feedback circuit.

6. The solid-state rotational rate sensor device of claim 2, wherein the electrical signal applied on the first set of piezoelectric elements is variable to modify a mechanical resonant frequency of the solid-state rotational rate sensor device.

7. The solid-state rotational rate sensor device of claim 2, wherein the piezoelectric material of the first set of the piezoelectric elements includes conductive electrodes placed on approximately opposite sides such that application of the electrical signal to the conductive electrodes causes a longitudinal variation of the piezoelectric material.

8. The solid-state rotational rate sensor device of claim 2, wherein the piezoelectric material is a thin-film piezoelectric material with a thickness of less than 10 microns and includes conductive electrodes placed on approximately opposite sides such that application of the electrical signal to the conductive electrodes causes a longitudinal variation of the thin-film piezoelectric material.

9. The solid-state rotational rate sensor device of claim 2, wherein the piezoelectric material is a thin-film piezoelectric material comprising a family of Lead-Zirconate-Titanate (PZT) compounds.

10. The solid-state rotational rate sensor device of claim 2, wherein the solid-state device includes a semi-rigid member fixed along a first edge to a proof mass and fixed along a second edge to the silicon chip.

11. The solid-state rotational rate sensor device of claim 10, wherein the semi-rigid support comprises a tuning fork.

12. The solid-state rotational rate sensor device of claim 10, wherein the semi-rigid support comprises a vibrating cup.

13. The solid-state rotational rate sensor device of claim 10, wherein the semi-rigid support comprises a comb structure.

14. The solid-state rotational rate sensor device of claim 10, wherein the semi-rigid support comprises an annular ring fixed along its outer circumference to the silicon chip and fixed along its inner circumference to a cylindrical proof mass.

15. A rotational rate sensor, comprising:

an integrated silicon chip;

a proof mass;

a first piezoelectric element for generating a force on the proof mass along a first direction by a first electrical signal;

a second piezoelectric element for generating a second electrical signal in proportion to the force on the proof mass along the first direction;

a third piezoelectric element for generating a third electrical signal in proportion to the force on the proof mass along a second direction; and an electrical circuit connected to the first piezoelectric element for applying the first electrical signal.

16. The rotational rate sensor of claim 15, further comprising a phase shift detection circuit that generates an electric output signal in proportion to a phase shift between the second and third electrical signals.

17. The rotational rate sensor of claim 15, further comprising a feedback circuit for feeding back a signal sensed by at least one set of the second and third sets of the piezoelectric elements to the first piezoelectric element.

* * * * *